United States Patent
Cruz San Martin et al.

(10) Patent No.: US 10,977,265 B2
(45) Date of Patent: Apr. 13, 2021

(54) PATH-BASED POPULATION VISUALIZATION

(71) Applicant: Drumwave Inc., Palo Alto, CA (US)

(72) Inventors: Javier Estaban Cruz San Martin, São Paulo (BR); Alberto Fernando Blumesnchein Cruz, São Paulo (BR); Andre Gustavo Vellozo Luz, Palo Alto, CA (US)

(73) Assignee: DRUMWAVE INC., Palo Alto, CA (US)

( * ) Notice: Subject to any disclaimer, the term of this patent is extended or adjusted under 35 U.S.C. 154(b) by 0 days.

(21) Appl. No.: 16/661,886

(22) Filed: Oct. 23, 2019

(65) Prior Publication Data

US 2020/0125560 A1    Apr. 23, 2020

Related U.S. Application Data

(60) Provisional application No. 62/749,211, filed on Oct. 23, 2018.

(51) Int. Cl.

| | |
|---|---|
| *G06F 16/901* | (2019.01) |
| *H04N 21/25* | (2011.01) |
| *H04N 21/466* | (2011.01) |
| *G06F 16/248* | (2019.01) |
| *G06F 3/14* | (2006.01) |
| *H04N 21/45* | (2011.01) |

(52) U.S. Cl.
CPC .............. *G06F 16/248* (2019.01); *G06F 3/14* (2013.01); *G06F 16/9024* (2019.01); *H04N 21/252* (2013.01); *H04N 21/4532* (2013.01); *H04N 21/4667* (2013.01)

(58) Field of Classification Search
None
See application file for complete search history.

(56) References Cited

U.S. PATENT DOCUMENTS

| | | | |
|---|---|---|---|
| 6,631,354 B1* | 10/2003 | Leymann | G06Q 10/10 705/7.26 |
| 2009/0144694 A1* | 6/2009 | Lin | G06Q 10/06 717/102 |
| 2010/0100562 A1* | 4/2010 | Millsap | G06T 11/206 707/770 |
| 2015/0143302 A1* | 5/2015 | Chang | G06F 3/04815 715/849 |

(Continued)

*Primary Examiner* — Joni Hsu
(74) *Attorney, Agent, or Firm* — Pillsbury Winthrop Shaw Pittman LLP

(57) ABSTRACT

Provided are methods and media for displaying mass data incomprehensible without computers by compiling behavioral data comprising a mass compilation of behavior of a population; determining whether the behavioral data from each of the plurality of sources is compatible with behavioral data from each of the other plurality of sources; if behavioral data from one or more of the plurality of sources is not compatible with the behavioral data from one or more of the other plurality of sources, harmonize the behavioral data; and compiling a subset of the behavioral data from the plurality of sources into a data visualization scheme; wherein the data visualization scheme comprises a path, wherein the path is subdivided into segments, and each segment represents a plurality of behaviors of a subset of the population.

20 Claims, 7 Drawing Sheets

(56) References Cited

U.S. PATENT DOCUMENTS

2016/0285707 A1* 9/2016 Pawlowski ......... G06F 3/04842
2016/0295260 A1* 10/2016 Qu ....................... H04N 21/252
2017/0063912 A1* 3/2017 Muddu .................... G06N 5/04
2019/0038184 A1* 2/2019 Narasimhan ........... A61B 5/681

* cited by examiner

PATH-BASED POPULATION VISUALIZATION

CROSS REFERENCE TO RELATED APPLICATIONS

This application claims priority to U.S. Provisional Patent Application 62/749,211 filed Oct. 23, 2018.

BACKGROUND

1. Field of the Disclosure

The present disclosure related generally to the field of data visualization, and is more specifically a system and method of receiving and outputting massive data in understandable visual form. The disclosure specifically improves upon static and incomplete data

2. Description of the Related Art

There are many fields in which data flows and analysis of changing information represented by the data over the flow period is useful. This can occur in any situation ranging from changing television viewership over time, population movements, electricity or power flow through a power grid, consumer behavior with respect to particular consumption choices (e.g., cell phone usage) and so on. In these fields, different tools are implemented to analyze data. These tools tend to be niche by industry and diffuse across the variety of situations in which the data is analyzed.

One common version of the analyzed data is in the television broadcast situation. This example will be leaned on heavily in this application. Currently the tools to assist TV broadcasters and programmers make sense of their audience data are provided by a few vendors, who typically also make a living selling overall TV audience and market data. Kantar Media or Nielsen are some of the names in this space.

The existing tools have a rather static view, and focus is on calculating averages and a few statistics in occasions extrapolated from surveys or from a few thousand sample households equipped with a device to measure TV channel tuning events e.g., tune-in, tune-out a channel.

Existing TV experiences, namely Linear, VOD, Digital and Mobile, come with their own ad-hoc tools, each tailored to legacy or some technology trends.

TV professionals use this data to track progress on specific Key Performance Indicators ("KPIs") and as a base for their decisions on TV programming, advertising, etc.

The current tools are provided by just a few vendors and are limited, niche, and isolated from other relevant data. The data is siloed based on these niches and historic behavior shows a segmented portion of the population of data relevant to the particular TV professionals, which may not be representative of the overall behavior of the relevant population. The siloed structure prevents complete analysis of the relevant population and impedes viable and valuable analysis of a complete data set.

To add to this, each TV experience, namely Linear, VOD, Digital and Mobile, ad-hoc tools do not communicate with each other and do not offer anything remotely similar to comprehensive cross-TV insights.

Regarding the tools to navigate the audience data, existing solutions support a time-based navigation of the data, basically what was the situation at every incremental hour/minute/second.

Meanwhile, the massive viewership data obtained from the TV broadcaster devices, servers and networks is not being tapped due to the complexity of processing such a large amount of data every day (e.g., in one case 7 billion lines per day).

Related fields are equally capable of high data flow and complexity of data that is difficult to analyze and comprehend because of the scale, changeability, and complexity of the information.

The data at issue cannot be meaningfully understood by humans outside of the computing process simply because of the mass amounts of data and the mass relationships are beyond an individual's ability to effectively understand the information and process it in a timely manner such that any understand gained can be acted upon while the information is usefully new. The problems with the prior art are unique to the computing platform on which the visuals are displayed. The data ages quickly and so presentation of data in its most useful manner is paramount. With ineffective methods of providing the data, the relationships and behaviors shown by the prior art methods are not understandable and usable before new data is received, such data rendering the older data of lesser value.

SUMMARY OF THE DISCLOSURE

The following is a non-exhaustive listing of some aspects of the present techniques. These and other aspects are described in the following disclosure.

Some aspects of the present disclosure of the "Transition Flow" solves the problems exposed previously due to a combination of one or more of the following steps, wherein the behavior of populations can be displayed in mass form:

Integrating data from several sources and vendors, in an open and flexible way. The system and media disclosed herein include receiving disparate information and making the data usable in a unified manner, compiling it into a dynamic visualization scheme for presentation to the user. The information received can be provided by third party providers, the individual users, cable television providers, satellite television providers, internet providers, individual websites, monitoring applications, or otherwise.

The flowing data is arranged in a data structure optimized for fast access not only by timestamp but also for any other categorical or numerical variables present on the working dataset, is done by a process if indexation of those variables regarding its timestamp occurrences.

Applied to our example the television example (but ultimately usable in innumerous varied situations): The audience data obtained by the TV broadcaster is now front and center and it is arranged in a data structure optimized for fast access not only by timestamp but also by any channel, programs, etc. Through this step, it is possible to detect optimizations of the TV programming based on the preferences of our user base.

A never-seen-before user interface (i.e., "The Snake") which makes possible to visually track and understand any particular set of key performance indicators ("KPIs"), e.g., regarding User Loyalty (or the lack of it), follow data tune-in and tune-out and progression during a time period (minute, hour, day, week, month), or in terms of the example: follow audience tune-in and tune-out and progression during a time period (minute, hour, day, week, month).

Other aspects of the present invention include similar behavior for non-viewer based information, and is readily adaptable to data relating to mass behaviors of many types.

BRIEF DESCRIPTION OF THE DRAWINGS

The foregoing aspects and advantages of the present disclosure will become more readily appreciated as the subject matter becomes better understood by reference to the following detailed description, when taken in conjunction with the accompanying drawings.

Figure 1:
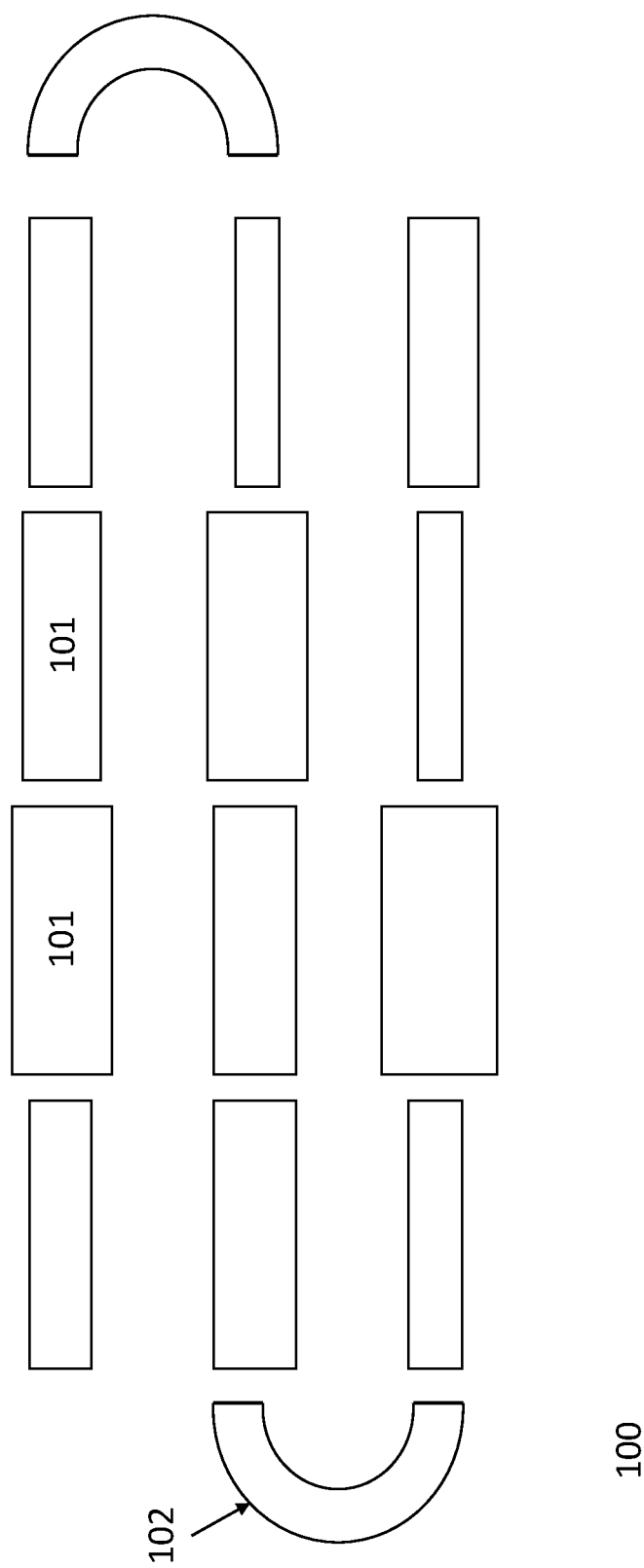
FIG. 1 is an embodiment of the display of one data visualization scheme in of the present disclosure, "The Snake."

While the invention is susceptible to various modifications and alternative forms, specific embodiments thereof are shown by way of example in the drawings and will herein be described in detail. The drawings may not be to scale. It should be understood, however, that the drawings and detailed description thereto are not intended to limit the invention to the particular form disclosed, but to the contrary, the intention is to cover all modifications, equivalents, and alternatives falling within the spirit and scope of the present invention as defined by the appended claims.

DETAILED DESCRIPTION OF CERTAIN EMBODIMENTS

To mitigate the problems described herein, the inventors had to both invent solutions and, in some cases just as importantly, recognize problems overlooked (or not yet foreseen) by others in the field of mass data visualization. Indeed, the inventors wish to emphasize the difficulty of recognizing those problems that are nascent and will become much more apparent in the future should trends in industry continue as the inventors expect. Further, because multiple problems are addressed, it should be understood that some embodiments are problem-specific, and not all embodiments address every problem with traditional systems described herein or provide every benefit described herein. That said, improvements that solve various permutations of these problems are described below.

Some embodiments of the present disclosure involve the reception, processing, and display of data in a visual form in a single representation understandable by a user. Under these embodiments, data is received from multiple sources which rely on and provide different data types and different data formats. In some embodiments, the data that is the subject of this disclosure includes data that represents the changing behavior of a population over time, or other changing metric against a particular criteria, e.g., behavior changes while in differing environments. In some embodiments, the data is processed and harmonized to be usable in a single display and existing silo structures are integrated into a single usable format. The data can be parsed according to its grammar and syntax and translated into a usable format compatible with other sources of data.

In some embodiments, the data can come from various sources, including commercial providers of consumer analysis, e.g., Nielson, and local applications capable of recording behaviors of users and transmitted via automated messages from underlying video consumption methods, e.g., video on demand, digital viewership, mobile viewership, and linear television. In some embodiments, the various digital television viewing options are connected via a communication network, e.g., the internet, to transmit some or all of the viewer and viewership specific data on a push basis or on a pull basis or other suitable basis. In some embodiments, some or all of the data is transmitted in different manners, including via hard disk or through physical means. At times, viewer specific data or viewership specific data is individualized or collected by group. In other embodiments, the data is compiled through various methods of statistical analysis, estimation, extrapolation, interpolation, and approximation, or other methods of simulating actual viewership data, or other data appropriate for use in the present disclosure.

In many embodiments of this disclosure, the data is received from different sources and the data is consolidated. In some embodiments, data consolidation physically brings data together from the several separate systems, creating a version of the consolidated data in one or more data stores. Extract, transform, and load (ETL) technology supports data consolidation, which in various embodiments pulls data from various sources, transforms it into an understandable format, and then transfers it to another database or data warehouse. When needed, the ETL process cleans, filters, and transforms data, and then applies any applicable business rules before data populates the new source. In some embodiments, data propagation follows. According to the teachings herein, in some embodiments applications copy data from one location to another, event-driven, synchronous or asynchronous. Some embodiments comprise synchronous data propagation supporting a two-way data exchange between the source of the data and the visualization system and methods described herein. In some embodiments, data virtualization is employed. According to these teachings, the data virtualization employs an interface to provide a near real-time, unified view of data from disparate sources with different data models. The data can be viewed in one location, but is not stored in that single location. In these embodiments, there is no requirement of uniform formatting or a single point of access.

The data visualization of the present disclosure is not limited to viewership but is applicable and particularly adaptable to any type of systems and enterprises that generate large data indicating behavior, e.g., listeners to radio and podcasts, consumers behavior in utilizing particular goods or brands, citywide transient human density through the day, smart meters monitoring electricity usage on a home-by-home basis, telephone traffic through different towers, etc. The user should understand that modifications to a particular type of dataset is contemplated herein.

In some embodiments, the data is gathered and stored at the time of viewing or within a brief period of time after viewing, e.g., after sufficient time for processing data.

The data stored can be any type of data desired for analysis. In some embodiments, the data gathered can be demographic data including individualized data or group data, time, date, channel, historic behavior, time for changing channels, time for beginning viewing, time for ending viewing, interactions with a device, or other relevant viewer data. Biographic data in some embodiments includes viewer-specific data including the type of device used, the age and gender of the viewer, the location of the viewer as identified at any useful level (by gross geographic region, by neighborhood, by distance from particular locations, by availability of particular service, etc.). At times, data can be associated with the individual from different sources, e.g., a satellite television provider and various mobile devices. In many embodiments, the data is sourced from different sources and formatted for use in unified visualization schemes.

In some embodiments, the data can be gathered and packaged for transmission at the site of the user or gathered at local base stations. Transmissions can be the result of messaging from a central location, can be an automated process initiated at set times or dates, or automated upon a triggering event, including a particular action, a cumulation of a particular amount of data or upon any other occasion.

The data is analyzed from various sources and in various formats and is processed to harmonize the data into a mutually compatible format. In this manner, the data undergoes the process of bringing together the data of varying file formats, naming conventions, and columns, and transforming it into one cohesive data set.

In various embodiments of the present disclosure, one or more of the visualization schemes described herein can be employed. A single embodiment can encompass multiple visualizations schemes. The visualization schemes employed herein can be performed by the manipulation of computing devices via instructions stored in non-transitory media.

With the creation of the visualization scheme described in, in an embodiment called The Snake shown as FIG. 1 under the teachings of this disclosure, the visualization can in near real time or viewed historically process and display the equivalent of billions of viewer-specific data for simple and efficient comprehension. The display in this embodiments follows a linear or curved path 100 representing, e.g., the passage of time, while displaying at any given section data corresponding to a point in time is presented in human understandable form, e.g., various colors representing channel viewership at point in time. The curvilinear path 100 is shown in FIG. 1, but a linear path is also within the scope of this disclosure. The path of The Snake in this embodiment comprises a cumulation of multiple paths representing behavior of one or more persons over the course of the time period. Different paths can be represented in the embodiment by different colored bands, representing a different plurality of viewers' behavior at a particular point in time. As can be seen in FIG. 1, the winding nature of The Snake effects multiple paths across a user's screen, which has the benefit of allowing multiple points in time to be analyzed in the same screen in a number much greater than a linear path. In these embodiments the paths wind along The Snake, indicating to user of the teachings herein of a change in behavior. In certain embodiments, for instance, a color represents viewership volume of a channel. The winding path 100 comprises a number of individual segments 101 that can vary from segment to segment representative of changes in dimension between segments. For instance, commonly a segment 101 will represent a certain period of time, for instance an hour. The segments can widen, as shown in FIG. 1, or change in other ways, such as a change in color, to indicate a change in data received relevant to that segment's dimension. The Snake is advantageously arranged in this example as traveling in alternating directions across the screen so that a long large number of first variables, e.g., the passage of time, can be represented on a single user's screen. In certain embodiments, a variety of connectors between segments indicate data related to the changed information in one segment to the next. The connections 102 similarly represent that information, but with the added benefit of facilitating the alternating back-and-forth display method of The Snake.

Figure 2:
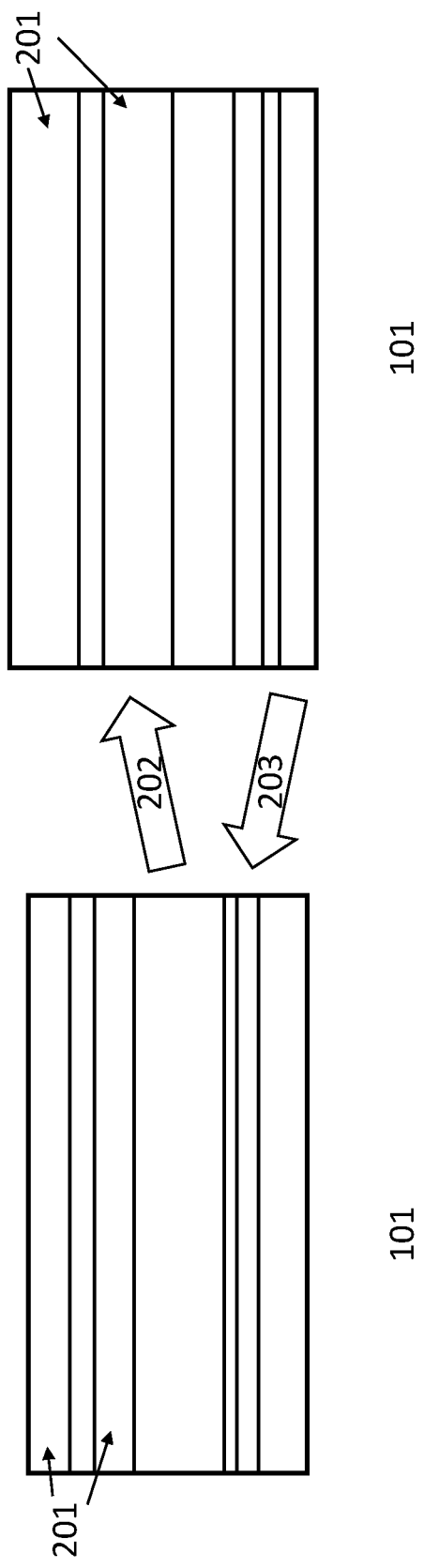
FIG. 2 is an embodiment of two segments of The Snake shown in FIG. 1.

FIG. 2 shows embodiments of individual segments as would be comprise the portions of The Snake. Each segment can represent different variable inputs, such as the passage of time, or a particular behavior. As shown in FIG. 1, as a period of time passes (i.e., the variable input for time changes from the time represented by the first segment to the second segment), for instance an hour, a number of viewers change to one of several other channel, a number of viewers cease viewing anything, and a number of viewers who were previously viewing nothing begin viewing, and a number of viewers who were viewing another channel begin viewing the identified channel. In FIG. 2, the band representing viewership of that channel changes in some embodiments, in this example in four ways: the band can widen to represent the increased viewership, the band 201 can widen from one segment to another with a trailing path 203 from the band representing the largest source of viewers previously viewing other channels that changed to the identified channel, the band 201 can narrow to represent the decreased viewership for those that ceased watching anything, and the band can narrow with a leading path 202 to the bands representing the largest subsequently viewed channel for viewers that change to a new channel. Segment 102 of FIG. 1 represents this same connection between the different rows of information. At the identified point in time a plurality of bands 201 can be utilized representing each of a plurality of different channels.

Figure 3:
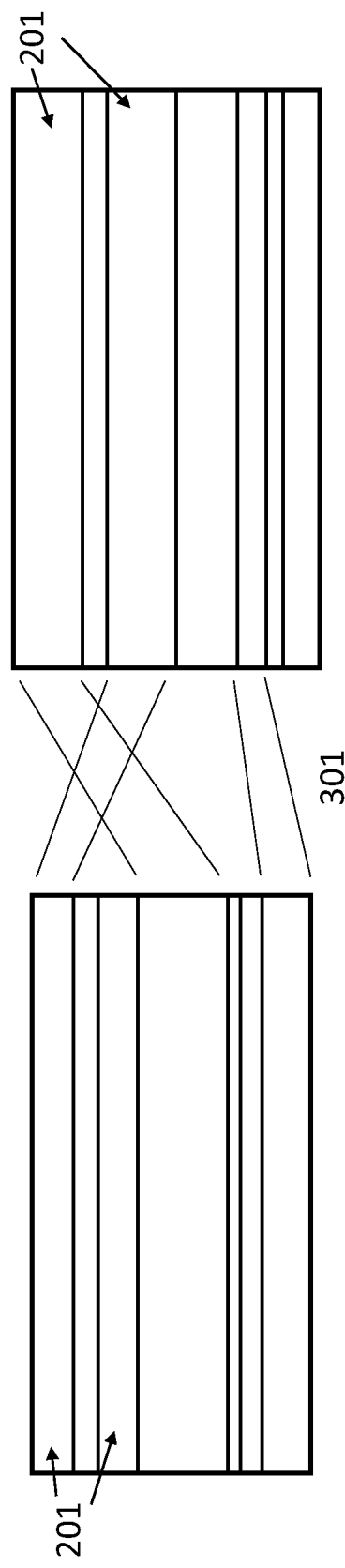
FIG. 3 is an embodiment of two segments of The Snake shown in FIG. 1, with connections showing the source and destination of certain information within each segment.

As shown in FIG. 3, the connections 301 between the segments 101 can be utilized to show the source of the change in behaviors between one segment and another. In this figure, consecutive segments 101 are shown, with connectors 301 between bands 201 indicating the transition from one behavior in the first (leftmost) segment to another behavior in the second (rightmost) segment. For instance, the top band 201 of the first segment 101 is shown to connect to the third band 201 in the second segment 101. In this manner, it is easily comprehensible that the growth of the third band 201 of the second segment 101 is mostly attributable to those that were in the first band 201 of the first segment. Note also that the first segment is larger in the second segment than in the first. The connections 301 indicate that the largest contributor to that growth was the fourth band 201 of the first segment 101. As a consequence, it is understandable that while the first band 201 of the second segment remained large from transitioning from the first segment 101 to the second segment 101, it is not necessarily true that the behavior is indicative of the same person acting. For example, in the case of television viewership, people switched from viewing the first channel in the first time slot to the third channel in the second. But that loss of viewership was contrasted with the increased viewership based on people changing from the fourth channel to the first. Note also that the thickness or width (in this case, the vertical dimension) is larger in the second segment than in the first, representing an overall increase in participants in the behavior, e.g., television viewership.

The visualization contemplated in this disclosure in most embodiments is far more detailed than is able to be represented in FIG. 1-3. In this manner, the techniques taught herein provide a detailed and nuanced view of millions or more pieces of data by leveraging the display capabilities of modern computer display devices. The individual bands shown in FIG. 2, for instance, could number in the hundreds for each individual segment. In this manner, the bands can also be grouped by kind, and the color scheme among bands can be likewise assigned in kind such that gradients between bands are formed. This leverages the viewer's eyes' ability to pick up on trends in colors and provides additional information than what is perceptible by numerical analysis alone. For instance, the groupings can be ranged based on common features. If television behaviors are represented in the bands over time in each segment, then the bands can be grouped into shows that have longer commercial breaks and those that have fewer, with a spectrum of colors from the most to the least. In this manner, the transitions can be visually perceptible for the user to when viewers watch shows irrespective of commercial breaks and when they avoid shows with commercial breaks. Other groupings are encompassed by this disclosure.

In other embodiments, the band can represent different behaviors. In some embodiments, visualization (e.g., The Snake) can represent viewership of a particular channel, with each of the bands representing viewership by source. In this embodiment, for instance, the visualization would represent a broadcast of a football game, and each of the bands would represent viewers' behaviors in receiving the band, e.g., through the satellite provider, on a mobile device, on linear television. Alternatively, the bands can represent the types of viewers of a particular program, with each band representing an age group, a geographic region, a gender, an income bracket, or any other biographic data or otherwise, or any combination of the data on particular viewers, for instance males between 20-29 years old, females in urban areas, Spanish-speaking residents of a particular state, etc.

In the embodiments in which visualization comprises a winding plurality of paths, the screen of the user is efficiently used. As the path winds over the screen multiple times, the viewer is able to see in a compact space a high number of different cross sections of the visualization (e.g., The Snake). In the embodiment shown in FIG. 1, the winding path 100 traverses the screen three times, and a typical viewing screen can reasonably display at least twenty different time slots in a manner large enough to communicate the relevant information to the user. In typical deployments of this disclosure, a segment can represent 6 hours, and consequently the visualization can show behaviors over a six-day period in a single display while effectively communicating the information to the user over that entire time period.

Visualizations can be accompanied by numerical and tabular data, with relevant data displayed to the user. The embodiment of FIG. 1 can be paired with this numerical and tabular data, and relevant data can show on a per channel, per time period, basis the number viewers gained, the number of viewers lost, the largest source of new viewers, the largest destination of viewers lost, the day's largest and smallest viewership, the time of largest and smallest viewership, and other relevant data. In many embodiments, the data displayed can be altered based on the needs of the user. In other embodiments, the data can be displayed based on the selection of the user, for instance, choosing a particular segment will display the relevant information for that segment, such as source of viewers gained and destination of lost, time users have been participating in the behavior, and so forth.

The visualization system identified herein can be utilized in a variety of computing platforms under a variety of computer languages. Various languages include JavaScript (with e.g., D3.js, DC.js) PYTHON, R and any other language appropriate for data visualization.

In some embodiments, the visualization is dynamic. In some embodiments, the data is synchronized. In an embodiment, the visualization allows for the addition of data during viewing and the visualization is modified accordingly. In this way, the data is processed iteratively and synchronously, for instance, The Snake changes as additional data is added to the set. In other embodiments, particular portions of the data can be selected or deselected to be added or subtracted from the visualization, respectively. In this manner, the data visualization occurs simultaneously or in near-real time. Simultaneously or near real time here is used in the sense that the data is received by the system, processed, and added to the visualization scheme appropriate under a given embodiment with the appropriate allowances for measurement and transmission speeds, processing speeds, data refresh speeds, and refresh speeds of the visual devices. In certain embodiments, the data can be displayed in the various forms switchable from one to the next, for instance, a user can select to have the data arranged in a heatmap, then as a time series plot, then as a network graph, then as The Snake. In these embodiments, a substantial overlap of data is represented in each display. For example, certain segments 101 of The Snake displaying television viewership can be selected and changed into a network graph, where viewers of each channel are represented by the behaviors 501, and the interrelationship between viewership sources indicated by the connectors 502. In this manner, the total viewership of a particular channel, represented by bands 201 in successive segments 101 could combine, e.g., by an average or in total, into a single behavior 501 with connections 502 to and from the channels that were the source or destination of the viewers 501. Different or more granular information can be viewed in this manner.

In certain embodiments where individual data is selectable, the data in that segment is enhanced for analysis. The enhancement for analysis can include zooming in on that segment and eliminating all or certain other of the segments from the visualization, breaking the behavioral data for that segment into finer detail showing refinements within particular groupings, allow certain groupings to be regrouped or split into subgroups, allowing data to be manually altered, and otherwise.

Figure 4:
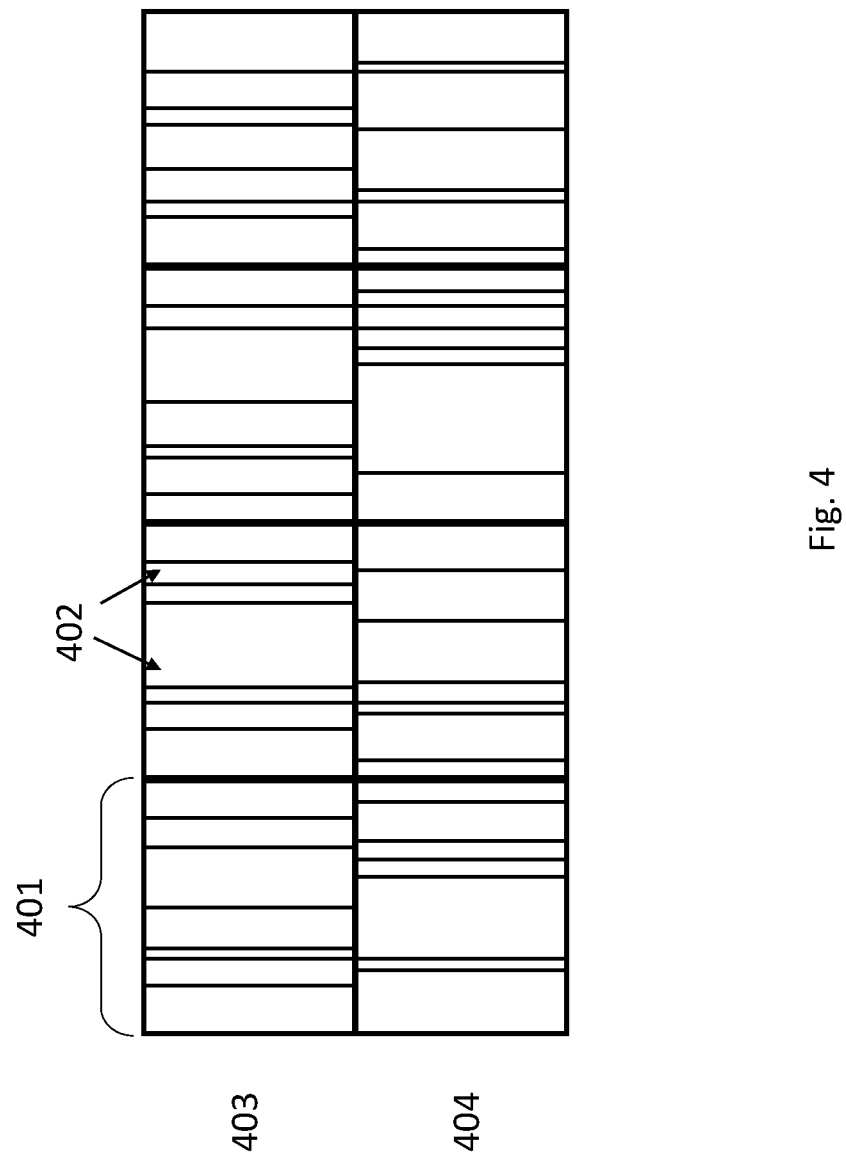
FIG. 4 is a second embodiment of a display of a data visualization scheme according to the present disclosure, a heatmap.
Figure 5:
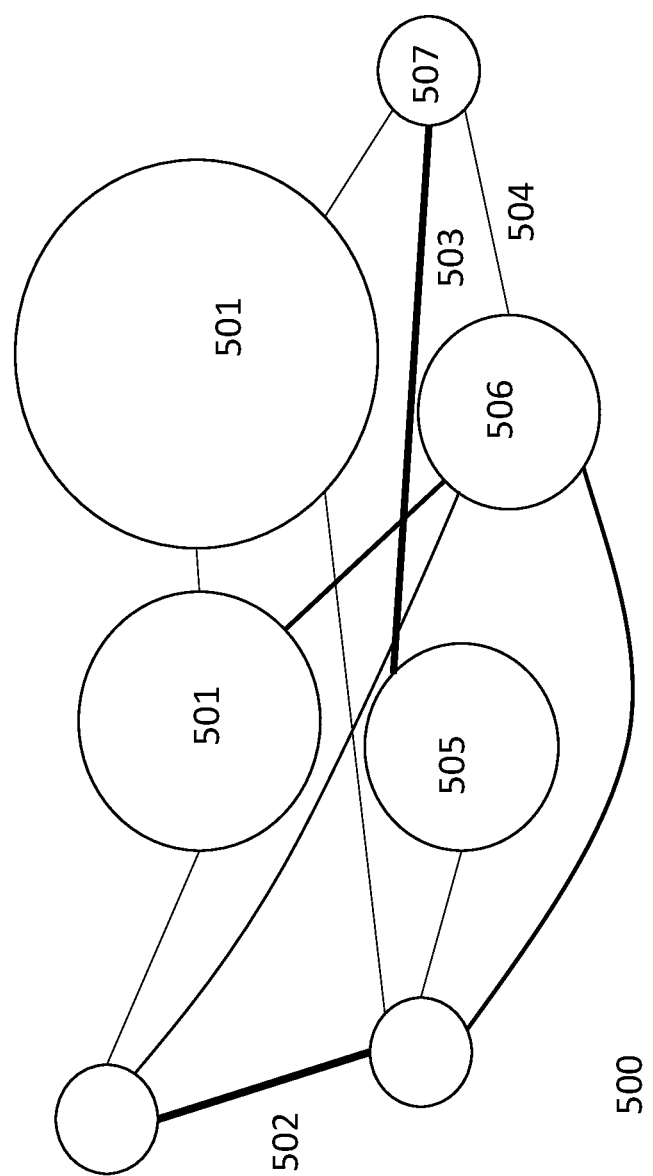
FIG. 5 is a third embodiment of a display of a data visualization scheme according to the present disclosure, a network graph.
Figure 6:
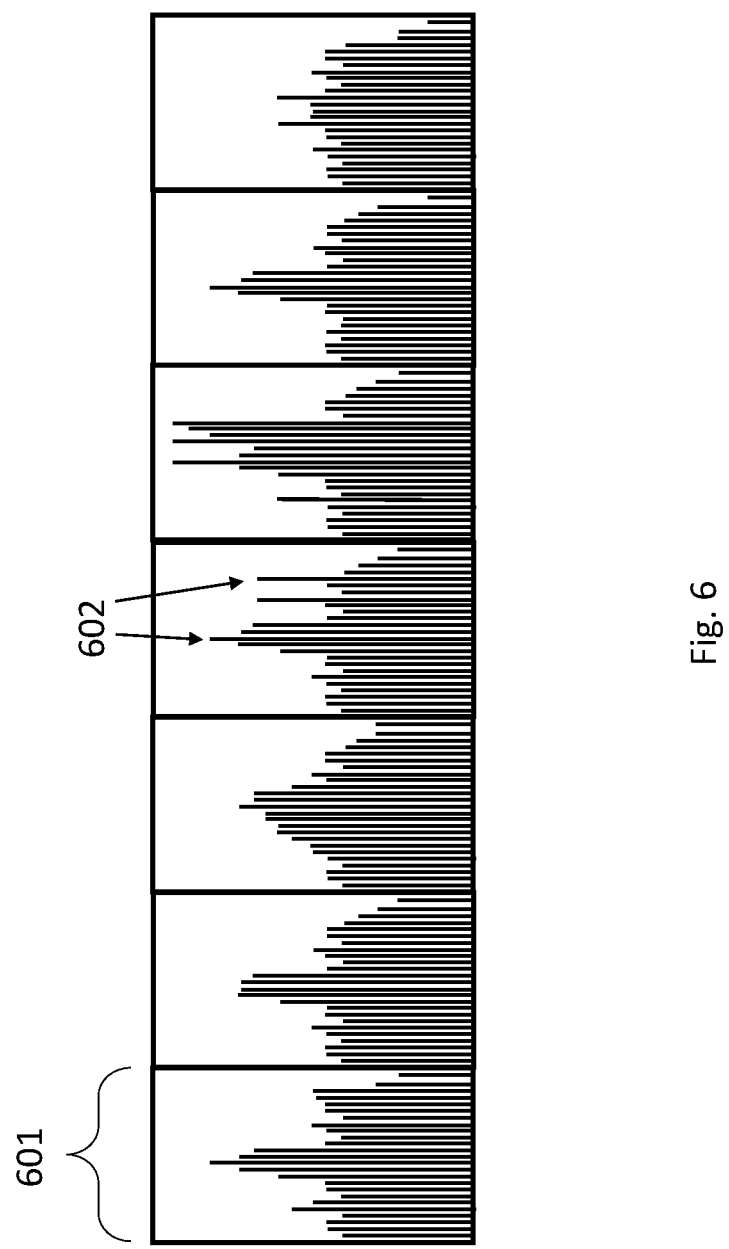
FIG. 6 is a fourth embodiment of a display of data visualization scheme according to the present disclosure, a collection of time-series plot

In some embodiments, visualization schemes other than the winding path can be implemented. As can be seen in FIGS. 4-6, the system is adaptable to heat maps, network graphs, and time-series plots. For instance, in FIG. 4, a heatmap is provided with major segments 401 shown and individual bands 402 within these major segments. In this data visualization scheme, a major segment 401 could be, for instance, a day, and the individual bands be represented by different colors indicating different levels of data. For instance, in television viewership of a heat map, the more people watching the television, the closer to the hotter end of the color spectrum the band can be, ranging a color spectrum from for instance, purple for low viewership to yellow for high viewership. Other color scales can also be appropriate, e.g., blue to red transitioning through light blue, green, yellow, and orange. In these data visualization schemes, each band is a different color.

In the visual scheme of FIG. 4, it can be seen that successive groups of major segments 401 can be arranged vertically into rows 403 and 404. In this manner, repeating major segments can be visually aligned to allow for effective comparison and comprehension between the rows. For example, row 403 can have seven major segments 401 representing the seven days of the week, and row 404 can represent the following week. Because of the advantageous placement of the major segments, a direct comparison between similar segments, e.g., consecutive Sundays, is possible.

As can be seen in FIG. 5, the interrelationships can be viewed as a network graph. Each behavior 501 can be plotted with, for example, the size of the individual circles 501 representative of the number of participants in that behavior. The larger circle 506 for instance is representative of more participants than the smaller circle 507. Size can also be representative of different values than number of participants, including for example, the total expenditures with respect to the behavior, or the length of time spent on a particular behavior. The connection 502 between the behaviors 501 indicate a commonality between those behaviors. For instance, in the case of product purchases, the connections 502 can indicate that purchasers of one product represented by a behavior circle also purchased the product within a second circle. In some embodiments, the width of the connections 502 represent the strength or likelihood of commonality between the behaviors. For instance, the thick line 503 between behavior 505 and 507 represents a strong correlation between the two, while a then connection 504 represents a weak correlation between 506 and 507. Where no connection 502 exists between certain behaviors, no correlation or correlation below a particular threshold can occur between the particular behaviors. In certain embodiments, the connections 502 can have arrows on one or both sides of the connection, to indicate whether a first behavior is predictive of a second behavior, whether both behaviors are predictive of either.

As shown in FIG. 6, much of the same information as shown in the FIG. 4 heatmap can be shown in a time series plots. In this manner, the major segments 601 can be divided and particular behavior can be represented by the height of a data read 602 at a particular time. As with the heat map, behaviors can be advantageously shown in repeated rows to allow for easier comparison over time. In some examples, the major segment 601 is a day, and the individual data read can be indicative of persons viewing a particular channel. In some embodiments, the individual data reads 602 can comprise a compilation of sub data reads. In this manner, multiple types of information can be displayed in a single chart. In the shown example, the row represents seven major segments 601 to comprise a week. Multiple weeks can be arranged in a display to show a number of easily comparable data.

Some aspects of the present disclosure include a non-transitory machine-readable storage medium having stored thereon a computer program for displaying data, the computer program comprising a routine of set instructions for causing the machine to perform the steps of: receiving behavioral data from a plurality of sources, the behavioral data comprising a mass compilation of behavior of a population; determining whether the behavioral data from each of the plurality of sources is compatible with behavioral data from each of the other plurality of sources; if behavioral data from one or more of the plurality of sources is not compatible with the behavioral data from one or more of the other plurality of sources, harmonize the behavioral data; and compiling a subset of the behavioral data from the plurality of sources into a data visualization scheme wherein the data visualization scheme comprises a path, wherein the path is subdivided into segments, and each segment represents a plurality of behaviors of a subset of the population.

Some aspects of the present disclosure include the medium above, wherein the machine is further caused to perform the steps of: compiling a second subset of the behavioral data from the plurality of sources into a second data visualization scheme wherein the second data visualization scheme comprises one or more of a heatmap, a network graph, and time-series plot a path, and wherein the first visualization scheme and the second visualization scheme represent common behavioral data.

Some aspects of the present disclosure include the medium above, wherein the segments are subdivided into a plurality of bands, and each band represents a behavior; and for each band, a feature of the band is alterable based on behavioral data related to the behavior.

Some aspects of the present disclosure include the medium above, wherein the features of the band are one or more of color and size.

Some aspects of the present disclosure include the medium above, wherein consecutive segments are connected with connectors, the connectors being representative of a change in behavioral data between consecutive segments.

Some aspects of the present disclosure include the medium above, wherein the change in behavioral data between a first consecutive segment and a second consecutive segment is users changing from a first behavior represented by a band in the first consecutive segment to a second behavior represented by a second band in the second consecutive segment.

Some aspects of the present disclosure include the medium above, wherein a dimension of each segment represents the size of the population engaging in all represented behaviors within that segment.

Some aspects of the present disclosure include the medium above, wherein the path is curvilinear.

Some aspects of the present disclosure include the medium above, wherein the path represents a period of time, and the segments represent a subset of the period of time.

Some aspects of the present disclosure include a method of graphical data visualization, comprising the steps of: receiving, at a computing device, a plurality of sources data representing a plurality of behaviors; presenting, on a display device, a linear representation or curvilinear representation comprising a first dimension and a second dimension, the first dimension representing a first variable input, wherein, changes in the first variable input is represented by a plurality of segments in the linear representation or curvilinear representation; and wherein, at each of the plurality of segments, the second dimension is representative of a plurality of behaviors corresponding to the first variable input at that segment.

Some aspects of the present disclosure include the method above, wherein the first variable input is time.

Some aspects of the present disclosure include the method above, wherein each of the plurality of behaviors is represented by each of a plurality of differing colors at a segment.

Some aspects of the present disclosure include the method above, wherein the data representing a plurality of behaviors includes volume data of each of the plurality of behaviors; and each segment further comprises a plurality of lines, each of the lines representative of one or more of the plurality of behaviors, wherein each of the lines is variable by thickness in relation to the volume data of each of the plurality of behaviors.

Some aspects of the present disclosure include the method above, wherein receiving data at the computing device and presenting on a display device occur simultaneously.

Some aspects of the present disclosure include the method above, wherein each of the plurality of segments is individually selectable by a user, and upon selection by the user, behavior data corresponding to the selected segment is enhanced for analysis, such enhancement including at least generating a plurality of individually selectable behaviors.

Some aspects of the present disclosure include the method above, presenting, on a display device, a second data visualization scheme wherein the second data visualization scheme comprises one or more of a heatmap, a network graph, and time-series plot a path, and wherein the first visualization scheme and the second visualization scheme represent common behavioral data.

Some aspects of the present disclosure include the method above, wherein consecutive segments are connected with connectors, the connectors being representative of a change in behavioral data between consecutive segments.

Some aspects of the present disclosure include the method above, wherein the change in behavioral data between a first consecutive segment and a second consecutive segment is users changing from a first behavior represented by a band in the first consecutive segment to a second behavior represented by a second band in the second consecutive segment.

Some aspects of the present disclosure include the method above, wherein a dimension of each segment represents the size of the population engaging in all represented behaviors within that segment.

Some aspects of the present disclosure include a system for viewing mass data, the system comprising a processor, a display, a plurality of sources of data, the data representing a plurality of behavior; and non-transitory machine-readable storage medium having stored thereon a computer program for displaying data, the computer program comprising a routine of set instructions for causing the machine to perform the steps of: receiving behavioral data from a plurality of sources, the behavioral data comprising a mass compilation of behavior of a population; determining whether the behavioral data from each of the plurality of sources is compatible with behavioral data from each of the other plurality of sources; if behavioral data from one or more of the plurality of sources is not compatible with the behavioral data from one or more of the other plurality of sources, harmonize the behavioral data; and compiling a subset of the behavioral data from the plurality of sources into a data visualization scheme wherein the data visualization scheme comprises a path, wherein the path is subdivided into segments, and each segment represents a plurality of behaviors of a subset of the population.

Figure 7:
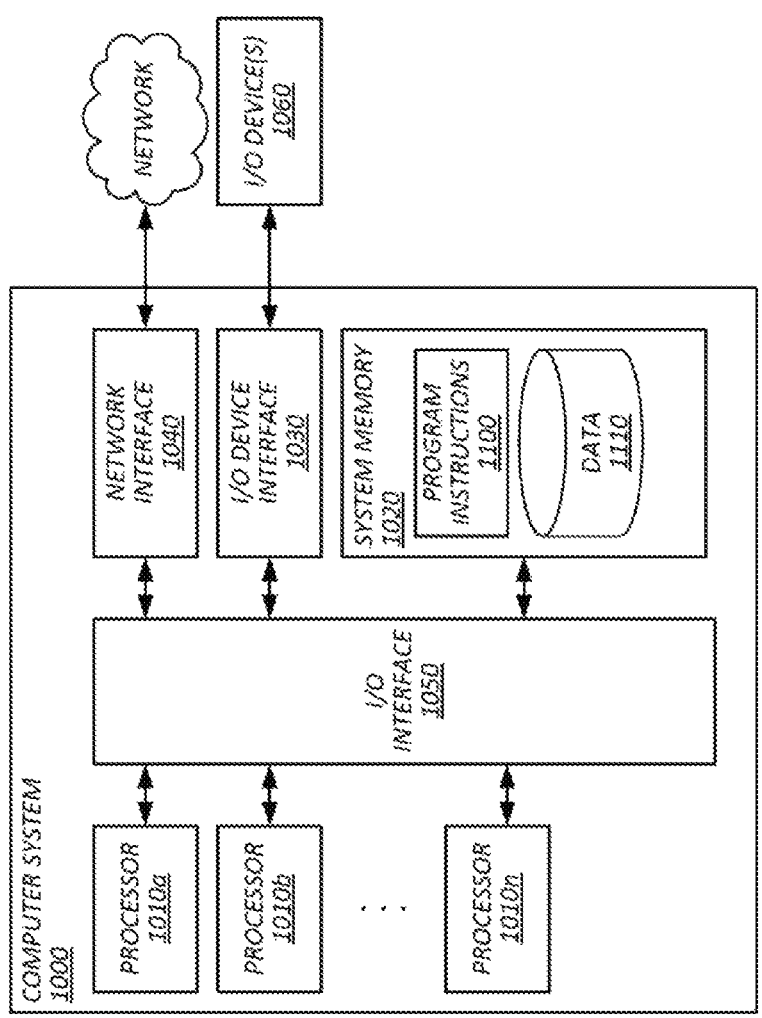
FIG. 7 is an exemplary computing device programmable for use with the present disclosure.

As can be seen in FIG. 7, computing system 1000 may include one or more processors (e.g., processors 1010a-1010n) coupled to system memory 1020, an input/output I/O device interface 1030, and a network interface 1040 via an input/output (I/O) interface 1050. A processor may include a single processor or a plurality of processors (e.g., distributed processors). A processor may be any suitable processor capable of executing or otherwise performing instructions. A processor may include a central processing unit (CPU) that carries out program instructions to perform the arithmetical, logical, and input/output operations of computing system 1000. A processor may execute code (e.g., processor firmware, a protocol stack, a database management system, an operating system, or a combination thereof) that creates an execution environment for program instructions. A processor may include a programmable processor. A processor may include general or special purpose microprocessors. A processor may receive instructions and data from a memory (e.g., system memory 1020). Computing system 1000 may be a uni-processor system including one processor (e.g., processor 1010a), or a multi-processor system including any number of suitable processors (e.g., 1010a-1010n). Multiple processors may be employed to provide for parallel or sequential execution of one or more portions of the techniques described herein. Processes, such as logic flows, described herein may be performed by one or more programmable processors executing one or more computer programs to perform functions by operating on input data and generating corresponding output. Processes described herein may be performed by, and apparatus can also be implemented as, special purpose logic circuitry, e.g., an FPGA (field programmable gate array) or an ASIC (application specific integrated circuit). Computing system 1000 may include a plurality of computing devices (e.g., distributed computer systems) to implement various processing functions.

I/O device interface 1030 may provide an interface for connection of one or more I/O devices 1060 to computer system 1000. I/O devices may include devices that receive input (e.g., from a user) or output information (e.g., to a user). I/O devices 1060 may include, for example, graphical user interface presented on displays (e.g., a cathode ray tube (CRT) or liquid crystal display (LCD) monitor), pointing devices (e.g., a computer mouse or trackball), keyboards, keypads, touchpads, scanning devices, voice recognition devices, gesture recognition devices, printers, audio speakers, microphones, cameras, or the like. I/O devices 1060 may be connected to computer system 1000 through a wired or wireless connection. I/O devices 1060 may be connected to computer system 1000 from a remote location. I/O devices 1060 located on remote computer system, for example, may be connected to computer system 1000 via a network and network interface 1040.

Network interface 1040 may include a network adapter that provides for connection of computer system 1000 to a network. Network interface may 1040 may facilitate data exchange between computer system 1000 and other devices connected to the network. Network interface 1040 may support wired or wireless communication. The network may include an electronic communication network, such as the Internet, a local area network (LAN), a wide area network (WAN), a cellular communications network, or the like.

System memory 1020 may be configured to store program instructions 1100 or data 1110. Program instructions 1100 may be executable by a processor (e.g., one or more of processors 1010a-1010n) to implement one or more embodiments of the present techniques. Instructions 1100 may include modules of computer program instructions for implementing one or more techniques described herein with regard to various processing modules. Program instructions may include a computer program (which in certain forms is known as a program, software, software application, script, or code). A computer program may be written in a programming language, including compiled or interpreted languages, or declarative or procedural languages. A computer program may include a unit suitable for use in a computing environment, including as a stand-alone program, a module, a component, or a subroutine. A computer program may or may not correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one or more computer processors located locally at one site or distributed across multiple remote sites and interconnected by a communication network.

System memory 1020 may include a tangible program carrier having program instructions stored thereon. A tangible program carrier may include a non-transitory computer readable storage medium. A non-transitory computer readable storage medium may include a machine readable storage device, a machine readable storage substrate, a memory device, or any combination thereof. Non-transitory computer readable storage medium may include non-volatile memory (e.g., flash memory, ROM, PROM, EPROM, EEPROM memory), volatile memory (e.g., random access memory (RAM), static random access memory (SRAM), synchronous dynamic RAM (SDRAM)), bulk storage memory (e.g., CD-ROM and/or DVD-ROM, hard-drives), or the like. System memory 1020 may include a non-transitory computer readable storage medium that may have program instructions stored thereon that are executable by a computer processor (e.g., one or more of processors 1010a-1010n) to cause the subject matter and the functional operations described herein. A memory (e.g., system memory 1020) may include a single memory device and/or a plurality of memory devices (e.g., distributed memory devices). Instructions or other program code to provide the functionality described herein may be stored on a tangible, non-transitory computer readable media. In some cases, the entire set of instructions may be stored concurrently on the media, or in some cases, different parts of the instructions may be stored on the same media at different times.

I/O interface 1050 may be configured to coordinate I/O traffic between processors 1010a-1010n, system memory 1020, network interface 1040, I/O devices 1060, and/or other peripheral devices. I/O interface 1050 may perform protocol, timing, or other data transformations to convert data signals from one component (e.g., system memory 1020) into a format suitable for use by another component (e.g., processors 1010a-1010n). I/O interface 1050 may include support for devices attached through various types of peripheral buses, such as a variant of the Peripheral Component Interconnect (PCI) bus standard or the Universal Serial Bus (USB) standard.

Embodiments of the techniques described herein may be implemented using a single instance of computer system 1000 or multiple computer systems 1000 configured to host different portions or instances of embodiments. Multiple computer systems 1000 may provide for parallel or sequential processing/execution of one or more portions of the techniques described herein.

Those skilled in the art will appreciate that computer system 1000 is merely illustrative and is not intended to limit the scope of the techniques described herein. Computer system 1000 may include any combination of devices or software that may perform or otherwise provide for the performance of the techniques described herein. For example, computer system 1000 may include or be a combination of a cloud-computing system, a data center, a server rack, a server, a virtual server, a desktop computer, a laptop computer, a tablet computer, a server device, a client device, a mobile telephone, a personal digital assistant (PDA), a mobile audio or video player, a game console, a vehicle-mounted computer, or a Global Positioning System (GPS), or the like. Computer system 1000 may also be connected to other devices that are not illustrated, or may operate as a stand-alone system. In addition, the functionality provided by the illustrated components may in some embodiments be combined in fewer components or distributed in additional components. Similarly, in some embodiments, the functionality of some of the illustrated components may not be provided or other additional functionality may be available.

Those skilled in the art will also appreciate that while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 1000 may be transmitted to computer system 1000 via transmission media or signals such as electrical, electromagnetic, or digital signals, conveyed via a communication medium such as a network or a wireless link. Various embodiments may further include receiving, sending, or storing instructions or data implemented in accordance with the foregoing description upon a computer-accessible medium. Accordingly, the present techniques may be practiced with other computer system configurations.

In block diagrams, illustrated components are depicted as discrete functional blocks, but embodiments are not limited to systems in which the functionality described herein is organized as illustrated. The functionality provided by each of the components may be provided by software or hardware modules that are differently organized than is presently depicted, for example such software or hardware may be intermingled, conjoined, replicated, broken up, distributed (e.g. within a data center or geographically), or otherwise differently organized. The functionality described herein may be provided by one or more processors of one or more computers executing code stored on a tangible, non-transitory, machine readable medium. In some cases, notwithstanding use of the singular term "medium," the instructions may be distributed on different storage devices associated with different computing devices, for instance, with each computing device having a different subset of the instructions, an implementation consistent with usage of the singular term "medium" herein. In some cases, third party content delivery networks may host some or all of the information conveyed over networks, in which case, to the extent information (e.g., content) is said to be supplied or otherwise provided, the information may be provided by sending instructions to retrieve that information from a content delivery network.

The reader should appreciate that the present application describes several independently useful techniques. Rather than separating those techniques into multiple isolated patent applications, applicants have grouped these techniques into a single document because their related subject matter lends itself to economies in the application process. But the distinct advantages and aspects of such techniques should not be conflated. In some cases, embodiments address all of the deficiencies noted herein, but it should be understood that the techniques are independently useful, and some embodiments address only a subset of such problems or offer other, unmentioned benefits that will be apparent to those of skill in the art reviewing the present disclosure. Due to costs constraints, some techniques disclosed herein may not be presently claimed and may be claimed in later filings, such as continuation applications or by amending the present claims. Similarly, due to space constraints, neither the Abstract nor the Summary of the Invention sections of the present document should be taken as containing a comprehensive listing of all such techniques or all aspects of such techniques.

It should be understood that the description and the drawings are not intended to limit the present techniques to the particular form disclosed, but to the contrary, the intention is to cover all modifications, equivalents, and alternatives falling within the spirit and scope of the present techniques as defined by the appended claims. Further modifications and alternative embodiments of various aspects of the techniques will be apparent to those skilled in the art in view of this description. Accordingly, this description and the drawings are to be construed as illustrative only and are for the purpose of teaching those skilled in the art the general manner of carrying out the present techniques. It is to be understood that the forms of the present techniques shown and described herein are to be taken as examples of embodiments. Elements and materials may be substituted for those illustrated and described herein, parts and processes may be reversed or omitted, and certain features of the present techniques may be utilized independently, all as would be apparent to one skilled in the art after having the benefit of this description of the present techniques. Changes may be made in the elements described herein without departing from the spirit and scope of the present techniques as described in the following claims. Headings used herein are for organizational purposes only and are not meant to be used to limit the scope of the description.

As used throughout this application, the word "may" is used in a permissive sense (i.e., meaning having the potential to), rather than the mandatory sense (i.e., meaning must). The words "include", "including", and "includes" and the like mean including, but not limited to. It should be understood that any usage of words where a generic descriptor is used and the specific examples follow (for example, when a word or phrase is followed by "such as", "including but not limited to" "e.g." and one or more examples) the absence of such phrase elsewhere should not be interpreted to mean the opposite, that is, the absence of verbiage indicating something "is not limited to" a particular set of examples should not be interpreted to mean that that the embodiment is limited to the specific examples unless wording is included specifically indicating such limitation. As used throughout this application, the singular forms "a," "an," and "the" include plural referents unless the content explicitly indicates otherwise. Thus, for example, reference to "an element" or "a element" includes a combination of two or more elements, notwithstanding use of other terms and phrases for one or more elements, such as "one or more." The term "or" is, unless indicated otherwise, non-exclusive, i.e., encompassing both "and" and "or." Terms describing conditional relationships, e.g., "in response to X, Y," "upon X, Y,", "if X, Y," "when X, Y," and the like, encompass causal relationships in which the antecedent is a necessary causal condition, the antecedent is a sufficient causal condition, or the antecedent is a contributory causal condition of the consequent, e.g., "state X occurs upon condition Y obtaining" is generic to "X occurs solely upon Y" and "X occurs upon Y and Z." Such conditional relationships are not limited to consequences that instantly follow the antecedent obtaining, as some consequences may be delayed, and in conditional statements, antecedents are connected to their consequents, e.g., the antecedent is relevant to the likelihood of the consequent occurring. Statements in which a plurality of attributes or functions are mapped to a plurality of objects (e.g., one or more processors performing steps A, B, C, and D) encompasses both all such attributes or functions being mapped to all such objects and subsets of the attributes or functions being mapped to subsets of the attributes or functions (e.g., both all processors each performing steps A-D, and a case in which processor 1 performs step A, processor 2 performs step B and part of step C, and processor 3 performs part of step C and step D), unless otherwise indicated. Further, unless otherwise indicated, statements that one value or action is "based on" another condition or value encompass both instances in which the condition or value is the sole factor and instances in which the condition or value is one factor among a plurality of factors. Unless otherwise indicated, statements that "each" instance of some collection have some property should not be read to exclude cases where some otherwise identical or similar members of a larger collection do not have the property, i.e., each does not necessarily mean each and every. Limitations as to sequence of recited steps should not be read into the claims unless explicitly specified, e.g., with explicit language like "after performing X, performing Y," in contrast to statements that might be improperly argued to imply sequence limitations, like "performing X on items, performing Y on the X'ed items," used for purposes of making claims more readable rather than specifying sequence. Statements referring to "at least Z of A, B, and C," and the like (e.g., "at least Z of A, B, or C"), refer to at least Z of the listed categories (A, B, and C) and do not require at least Z units in each category. Unless specifically stated otherwise, as apparent from the discussion, it is appreciated that throughout this specification discussions utilizing terms such as "processing," "computing," "calculating," "determining" or the like refer to actions or processes of a specific apparatus, such as a special purpose computer or a similar special purpose electronic processing/computing device. Features described with reference to geometric constructs, like "parallel," "perpendicular/orthogonal," "square", "cylindrical," and the like, should be construed as encompassing items that substantially embody the properties of the geometric construct, e.g., reference to "parallel" surfaces encompasses substantially parallel surfaces. The permitted range of deviation from Platonic ideals of these geometric constructs is to be determined with reference to ranges in the specification, and where such ranges are not stated, with reference to industry norms in the field of use, and where such ranges are not defined, with reference to industry norms in the field of manufacturing of the designated feature, and where such ranges are not defined, features substantially embodying a geometric construct should be construed to include those features within 15% of the defining attributes of that geometric construct.

In this patent, to the extent certain U.S. patents, U.S. patent applications, or other materials (e.g., articles) have been incorporated by reference, the text of such U.S. patents, U.S. patent applications, and other materials is, however, only incorporated by reference to the extent that no conflict exists between such material and the statements and drawings set forth herein. In the event of such conflict, the text of the present document governs, and terms in this document should not be given a narrower reading in virtue of the way in which those terms are used in other materials incorporated by reference.

We claim:

1. A non-transitory machine-readable storage medium having stored thereon a computer program for displaying data, the computer program comprising a routine of set instructions for causing a machine to perform the steps of:
receiving behavioral data from a plurality of sources, the behavioral data comprising a mass compilation of behavior of a population;
determining whether the behavioral data from each of the plurality of sources is compatible with behavioral data from each of the other plurality of sources;
if behavioral data from one or more of the plurality of sources is not compatible with the behavioral data from one or more of the other plurality of sources, harmonize the behavioral data; and
compiling a subset of the behavioral data from the plurality of sources into a data visualization scheme, wherein:
the data visualization scheme comprises a path,
the path is subdivided into segments,
each respective segment of the segments represents a plurality of behaviors of a subset of the population,
the segments are subdivided into a plurality of bands, each respective band of the plurality of bands representing a respective behavior, and
for each respective band of the plurality of bands, a feature of the respective band is alterable based on behavioral data related to the respective behavior.

2. The medium of claim 1, wherein the data visualization scheme is a first data visualization scheme, and wherein the machine is further caused to perform the steps of:
compiling a second subset of the behavioral data from the plurality of sources into a second data visualization scheme;
wherein the second data visualization scheme comprises one or more of a heatmap, a network graph, and time-series plot,
and wherein the first data visualization scheme and the second data visualization scheme represent common behavioral data.

3. The medium of claim 1, wherein the features of the plurality of bands are one or more of color and size.

4. The medium of claim 1, wherein consecutive segments are connected with connectors, the connectors being representative of a change in behavioral data between the consecutive segments.

5. The medium of claim 4, wherein the change in behavioral data between a first consecutive segment and a second consecutive segment is users changing from a first behavior represented by a band in the first consecutive segment to a second behavior represented by a second band in the second consecutive segment.

6. The medium of claim 5, wherein a dimension of each segment represents a size of the population engaging in all represented behaviors within that segment.

7. The medium of claim 6, wherein the path is curvilinear.

8. The medium of claim 7, wherein the path represents a period of time, and the segments represent a subset of the period of time.

9. A method of graphical data visualization, the method comprising:
receiving, at a computing device, a plurality of sources data representing a first plurality of behaviors;
presenting, on a display device, a linear representation or curvilinear representation comprising a first dimension and a second dimension, the first dimension representing a first variable input, wherein:
changes in the first variable input is represented by a plurality of segments in the linear representation or curvilinear representation;
at each respective segment of the plurality of segments, the second dimension is representative of a respective plurality of behaviors corresponding to the first variable input at that respective segment, the first plurality of behaviors comprising the respective plurality of behaviors;
the plurality of segments are subdivided into a plurality of bands, each respective band of the plurality of bands representing a respective behavior; and
for each respective band of the plurality of bands, a feature of the respective band is alterable based on behavioral data related to the respective behavior.

10. The method of claim 9, wherein the first variable input is time.

11. The method of claim 9, wherein each of the first plurality of behaviors is represented by each of a plurality of differing colors at a segment.

12. The method of claim 9, wherein:
data representing the first plurality of behaviors includes volume data of each of the first plurality of behaviors; and
each segment further comprises a plurality of lines, wherein each of the plurality of lines is representative of one or more of the first plurality of behaviors, and wherein each of the plurality of lines is variable by thickness in relation to the volume data of each of the first plurality of behaviors.

13. The method of claim 9, wherein receiving data at the computing device and presenting on the display device occur simultaneously.

14. The method of claim 9, wherein each of the plurality of segments is individually selectable by a user, and upon selection by the user, behavior data corresponding to the selected segment is enhanced for analysis, such enhancement including at least generating a plurality of individually selectable behaviors.

15. The method of claim 9, wherein the linear representation or curvilinear representation is a first linear representation or curvilinear representation, the method further comprising:
presenting, on the display device, a second linear representation or curvilinear representation,
wherein the second linear representation or curvilinear representation comprises one or more of a heatmap, a network graph, and time-series plot,
and wherein the first linear representation or curvilinear representation and the second linear representation or curvilinear representation represent common behavioral data.

16. The method of claim 9, wherein consecutive segments are connected with connectors, the connectors being representative of a change in behavioral data between the consecutive segments.

17. The method of claim 16, wherein the change in behavioral data between a first consecutive segment and a second consecutive segment is users changing from a first behavior represented by a band in the first consecutive segment to a second behavior represented by a second band in the second consecutive segment.

18. The method of claim 9, wherein a dimension of each segment represents a size of a population engaging in all represented behaviors within that segment.

19. A system for viewing mass data, the system comprising:
- a processor;
- a display;
- a plurality of sources of data, the data representing a plurality of behavior; and
- non-transitory machine-readable storage medium having stored thereon a computer program for displaying data, the computer program comprising a routine of set instructions for causing the machine to perform the steps of:
  - receiving behavioral data from a plurality of sources, the behavioral data comprising a mass compilation of behavior of a population;
  - determining whether the behavioral data from each of the plurality of sources is compatible with behavioral data from each of the other plurality of sources;
  - if behavioral data from one or more of the plurality of sources is not compatible with the behavioral data from one or more of the other plurality of sources, harmonize the behavioral data; and
  - compiling a subset of the behavioral data from the plurality of sources into a data visualization scheme, wherein:
  - the data visualization scheme comprises a path,
  - the path is subdivided into segments,
  - each respective segment of the segments represents a plurality of behaviors of a subset of the population,
  - the segments are subdivided into a plurality of bands, each respective band of the bands representing a respective behavior, and
  - for each respective band of the bands, a feature of the respective band is alterable based on behavioral data related to the respective behavior.

20. The system of claim 19, wherein the features of the plurality of bands are one or more of color and size.

* * * * *